UNITED STATES PATENT OFFICE.

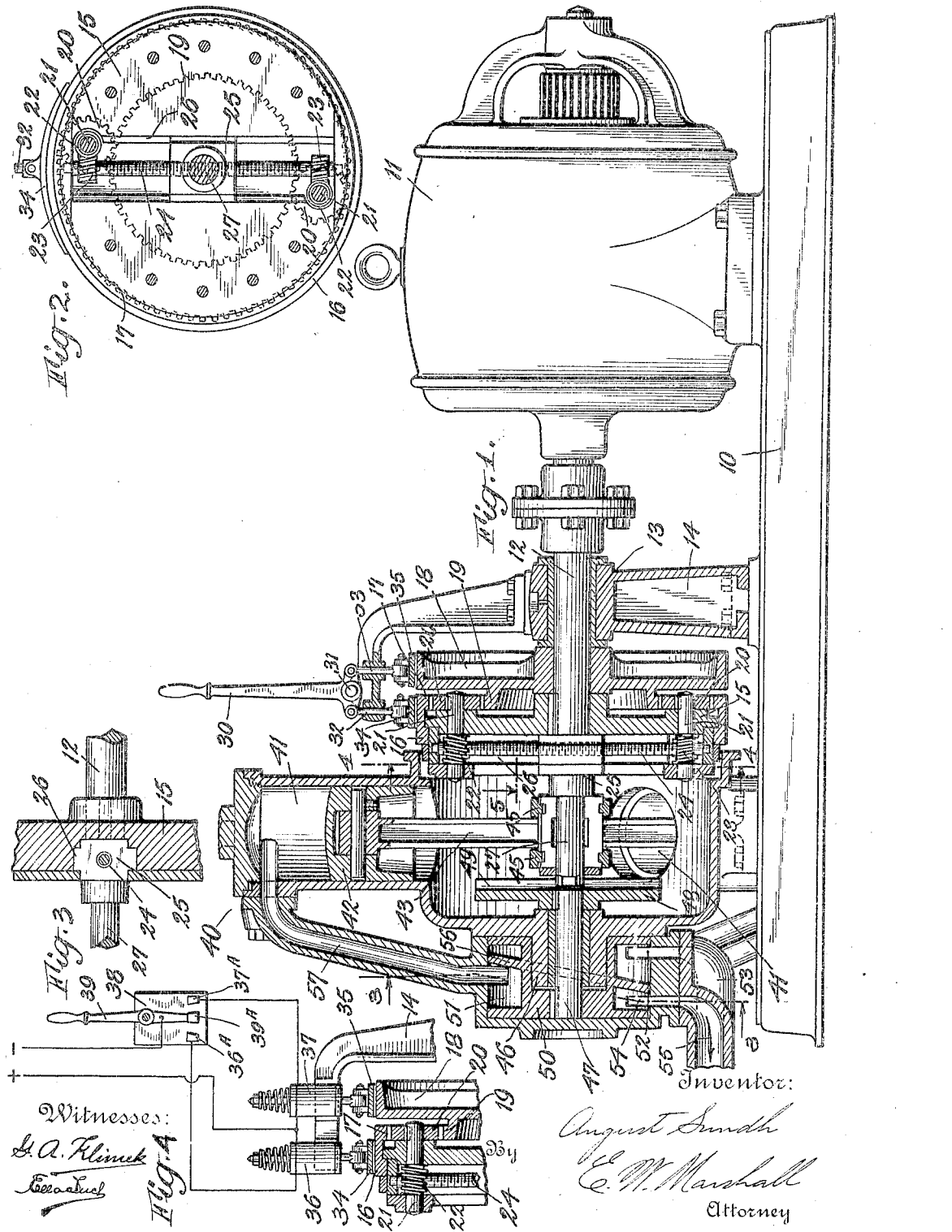

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

ADJUSTABLE TRANSMISSION MECHANISM.

1,099,473. Specification of Letters Patent. Patented June 9, 1914.

Application filed December 18, 1909. Serial No. 533,793.

*To all whom it may concern:*

Be it known that I, AUGUST SUNDH, a citizen of the United States, and a resident of the city of Yonkers, in the county of Westchester and State of New York, United States of America, have invented certain new and useful Improvements in Adjustable Transmission Mechanism, of which the following is a specification.

My invention relates to novel mechanical connections or gearing which may be adjusted at will to produce desired results, and its object is to provide a simple and efficient apparatus of this character.

I will describe my invention in the following specification and point out the novel features thereof in the appended claims.

Referring to the drawings, Figure 1 is a side elevation, partly in section, of a pumping apparatus driven by an electric motor, with their parts connected according to my invention. Fig. 2 shows a center shifting device in end elevation. This figure is a section on the line 4—4 of Fig. 1, with the view taken in the direction of the arrows. A portion of this mechanism is shown in sectional plan view in Fig. 3. In Fig. 4 I have shown a part of the center shifting mechanism and have illustrated in connection with it a modified form of control therefor.

Like characters of reference designate corresponding parts in all of the figures.

10 designates a base upon which the various parts of my apparatus may be mounted. 11 is a motor by means of which a shaft 12 is driven. In the drawings an electric motor is for convenience shown, but any other kind of motive power may be used if desired. The shaft 12 is supported in a bearing 13, in a pedestal 14, affixed to the base 10, and carries on its outer end a frame 15 which is rigidly affixed to the shaft. On the outside of this frame is supported a rim 16 which has a smooth cylindrical outer surface. Its inner surface on one side is constructed to form an internal gear 17. This rim is not affixed to the frame 15 but is frictionally supported thereon and is rotatable relative to the frame. Loosely mounted upon the shaft 12 between the pedestal 14 and the frame 15 is a disk 18, the outer periphery of which is cylindrical and preferably of the same diameter as that of the rim 16. Affixed to this disk or constructed as an integral part thereof is a gear 19.

20, 20 designates pinions affixed to shafts 21, 21, which are rotatably mounted in the frame 15. These pinions are in mesh with and connect the gears 17 and 19. Each of the shafts 21 bears a worm-gear 22 which is arranged to rotate with the shaft, and these gears mesh with worm-wheels 23, 23, near the ends of a transverse shaft 24, diametrically mounted in the frame 15 at right-angles to the driving shaft 12. The shaft 24 is threaded throughout the greater part of its length, and passes through a shifting-center block 25 which is provided with corresponding internal threads. This block is supported in a guiding groove 26 running across the face of the frame 15. A shaft 27 projects from the block 25 in a direction parallel with the axis of shaft 12. This shaft 27, as will more fully appear hereinafter, forms a crank-pin of adjustable eccentricity. A hand-lever 30 is pivoted in the upper portion of pedestal 14 at 31. The lower end of this lever is provided with two short arms with which are connected by rods 32 and 33 with brake-shoes 34 and 35, which are over and are arranged to act upon the rim 16 and the disk 18, respectively. These connections are such that either of these brake-shoes may be moved into its operative position, but they cannot be made to both produce a braking effect at once.

40 is a pumping apparatus mounted upon base 10 which comprises three cylinders 41, radially disposed about a common center, which is in alinement with the axis of the driving shaft 12. Within each cylinder is a piston 42 which is connected with the shaft 27 by a connecting rod 43, the crank pin end of which is enlarged, and these enlarged ends are surrounded by rings 45, 45 which hold them against the shaft 27.

The casing 46 of the pumping apparatus forms a bearing for a shaft 47 which is in alinement with shaft 12. On one end of shaft 47 is keyed a member 48 in which is a transverse groove 49 into which the end of shaft 27 projects. The other end of shaft 47 bears a rotary valve member 50 which runs in a cylindrical valve-chest 51, the inner portion of which is connected through a port 52 with an inlet pipe 53, and the outer portion of which is connected through a port 54 with an outlet pipe 55. These two ports of the valve-chest are divided by an obliquely disposed portion 56 of the rotary valve which, as it rotates, connects passages 57, which run from the outer ends of the cylinders 41 to the valve-chest to which they are connected at points between the inlet and outlet connections, alternately and consecutively with these inlet and outlet pipes.

Before pointing out the mechanisms which are in the other figures of the drawings, I will describe the operation of such parts as I have already described. Let us suppose that the shaft 12 is being driven by the motor 11. This rotation is of course imparted to the frame 15, and the disk 18, by its connection with the frame through gears 17, 20, and 19, will also rotate with the shaft 12. If the block is in the position in which it is shown in the drawings, with its shaft 27 in alinement with the shaft 12, the former will freely rotate within the ends of the connecting rods 43 and will have no effect upon the pistons 42. If the operator moves the handle 30 to one side or the other he will thereby retard the rotation of the rim 16 relative to the disk 18, or retard the rotation of the disk 18 relative to the rim 16. This relative retardation of rotation will cause the pinions to rotate in one direction or the other, and through their connections with the transverse shaft 24, will cause the latter to be rotated to the right or to the left. This rotation of the threaded shaft 24 will cause the shifting-center block 25 to be moved away from the axis of shaft 12 to one side or the other, and, as the shaft 27 is rigidly affixed to the block, this shaft will be moved out of alinement with shaft 12, although the axes of both shafts remain parallel. Now, as the block 25 is supported by the guiding groove 26 in frame 15, it will be rotated thereby around the axis of shaft 12. Its connections with the pistons 42 through connecting rods 43 will then cause the latter to be reciprocated within the cylinders 41 through a greater or lesser path of travel, depending upon the amount which the block 25 has been shifted to one side or the other. At the same time the end of shaft 27 has been moved within the groove 49 in the member 48 so that the rotation of shaft 27 around the axis of shaft 12 and the axis of shaft 47, which is in alinement therewith, will cause the shaft 47 and its connected rotary valve to still be rotated in unison with the shaft 12.

The rotary valve, as has already been pointed out, is arranged to alternately connect the outer end of each cylinder with the inlet and outlet pipes 53 and 55, and during its rotation makes this alternate connection with these pipes to each of the cylinders 41. The above described connections are so arranged that during the inward stroke of each of the pistons 42 its respective cylinder will be connected with the inlet pipe 53, and during its outward stroke its cylinder will be connected with the outlet pipe 55.

The result will be that the reciprocation of the pistons will make the pumping apparatus 40 operative.

It is obvious that when the shifting-center block 25 has been moved but slightly away from its central position, it will cause a slight reciprocation of the pistons so that the pumping effect will be but slight. But a further shifting of the center block will cause a longer stroke of the pistons with a consequent increased pumping effect. The operator then may, through the lever 30, cause the pistons of the pumping apparatus to be moved but a very slight amount when it is desired to pump but little fluid, or he may at will run the shifting-center block 25 to the extreme end of its travel to thereby cause the pistons 42 to be reciprocated throughout their full stroke by means of the rotation of shaft 12 through the connections which I have above described. It is also clear that by moving the lever 30 in the opposite direction the block 25 may be returned partly or all the way, to its central position to reduce the pumping effect, or to entirely nullify it.

Referring now to Fig. 4 I will describe the arrangement whereby this manual control may be obtained from a point removed from the apparatus. In this case the brake-shoes 34 and 35 are connected with the cores of solenoids 36 and 37, respectively. + and — designate mains from a suitable source of electrical supply. One of these mains is connected with one of the terminals of the windings of each of the solenoids. Their other terminals are connected with stationary contacts 36$^A$ and 3$^{\prime}$, which are a part of an electrical switch 38. 39 is a hand-lever forming a part of this switch, which carries a movable contact 39$^A$ which is in electrical connection with the other of the mains.

The operation of this device is as follows: During the usual running of the apparatus the brake-shoes 34 and 35 are held out of contact with the rim 16 and disk 18 by means of springs which tend to raise the cores of the solenoids. If the operator throws lever 39 over to the right he thereby closes a circuit at contacts 36$^A$ and 39$^A$ through solenoid 36, which thereupon pulls its core downward and causes the brake-shoe 34 to be brought into engagement with the rim 16 to retard its rotation. The effect of this retardation upon the shifting-center block 25 has already been pointed out. If the operator pulls the lever 39 over to the left he will thereby close at the contacts 37$^A$ and 39$^A$ a circuit through solenoid 37 to bring the brake-shoe 35 into engagement with the disk 18 to shift the position of block 25 in the opposite direction. Obviously the switch 38 may be placed in any convenient location and connected with the other parts of the apparatus by electrical conductors. It is to be noted that the full power of the driving motor is at all times available; that is, when but little fluid is being pumped, enormous pressure is obtainable on account of the force available for driving the pistons with a crank-pin but slightly out of alinement with the driving shaft. When the stroke is increased the amount of fluid pumped will be greater, but the pressure will be correspondingly decreased.

The advantage of this invention may be readily seen when the pump is arranged, for example, to drive a fluid motor operatively connected with the wheels of an automobile, as by it great loads may be driven up steep grades slowly, or with lighter loads and with level stretches, the speed may be increased correspondingly. It is also possible to stop the driving mechanism without stopping the motor.

Obviously my invention is not limited to any specific form or arrangement of parts.

What I claim is:

1. A rotary shaft, a frame affixed thereto, said frame being constructed to form a guiding-groove, a rim rotatably mounted upon the frame, a disk rotatably mounted upon the shaft, pinions between said rim and said disk, a threaded shaft supported by said frame at right-angles to the rotary shaft, an internally threaded block upon the threaded shaft and within said groove, a crank-pin in alinement with the rotary shaft supported by said block, and means for retarding the rotation of the rim or of the disk to rotate the threaded shaft in either direction, and to thereby shift the position of the block.

2. A rotary shaft, a frame affixed thereto, said frame being constructed to form a guiding-groove, a cylindrical rim rotatably mounted upon the frame, one portion of said rim being constructed to form a gear, a disk rotatably mounted upon the shaft, a gear on said disk, pinions supported by the frame in mesh with both of said gears, a threaded shaft supported by said frame at right-angles to the rotary shaft, gearing connecting the opposite ends of said shaft with said pinions, an internally threaded block upon the threaded shaft and within said groove, a crank-pin parallel with the rotary shaft supported by said block, and manually operated brakes for retarding the rotation of the rim of the disk to rotate the threaded shaft in either direction from a position concentric with the said rotary shaft and to thereby shift the position of the block and crank-pin.

In testimony whereof I have signed my name to this specification in the presence of two subscribing witnesses.

, AUGUST SUNDH.

Witnesses:
ELLA TUCH,
MARIE L. BRESLIN.